United States Patent [19]
Juchem et al.

[11] Patent Number: 5,743,563
[45] Date of Patent: Apr. 28, 1998

[54] SAFETY-BELT ARRANGEMENT

[75] Inventors: Alois Juchem, Maisach; Marcus Fiege, Munich; Rafael Oberlaender, Elmshorn; Holger Dohse, Hamburg, all of Germany

[73] Assignee: Autoliv Development AB, Vargarda, Sweden

[21] Appl. No.: 704,600

[22] PCT Filed: Mar. 22, 1995

[86] PCT No.: PCT/SE95/00290

§ 371 Date: Nov. 22, 1996

§ 102(e) Date: Nov. 22, 1996

[87] PCT Pub. No.: WO95/25648

PCT Pub. Date: Sep. 28, 1995

[30] Foreign Application Priority Data

Mar. 22, 1994 [GB] United Kingdom ............... 9405692.6

[51] Int. Cl.⁶ .................................................. B60R 22/36
[52] U.S. Cl. ................................... 280/806; 297/480
[58] Field of Search ................................. 280/806, 807; 297/476, 479, 480

[56] References Cited

U.S. PATENT DOCUMENTS

| | | | |
|---|---|---|---|
| 4,492,348 | 1/1985 | Ziv et al. | 280/806 |
| 4,550,951 | 11/1985 | Apri | 280/806 |
| 5,029,896 | 7/1991 | Ernst | 280/806 |
| 5,323,977 | 6/1994 | Frei et al. | 242/381.1 |
| 5,350,195 | 9/1994 | Brown | 280/806 |

FOREIGN PATENT DOCUMENTS

| | | |
|---|---|---|
| 0056894 | 8/1982 | European Pat. Off. . |
| 0307822 | 3/1989 | European Pat. Off. . |
| 0487760 | 6/1992 | European Pat. Off. . |
| 0556718 | 8/1993 | European Pat. Off. . |
| 3233969 | 3/1984 | Germany . |
| 3817170 | 12/1988 | Germany . |
| 3828069 | 3/1989 | Germany . |
| 2113978 | 8/1983 | United Kingdom . |

*Primary Examiner*—Paul N. Dickson
*Attorney, Agent, or Firm*—Spencer & Frank

[57] ABSTRACT

A web-grabber for use with a safety-belt comprises a housing(5) formed as an extrusion of aluminium. A wedge (13) is located within a central passage(6) within the housing. An additional element(20) is also present within the passage(6) having a first side(21) adapted to abut one of the substantially parallel side walls of the passage(6) and an opposed inclined face(22) along which the wedge(13) may slide. The wedge is adapted to engage wedgingly the webbing(3) of a safety-belt, with a face(14) of the wedge engaging the webbing(3) and pressing it against an opposed element(11) which passes through the passage(6) and which secures the extrusion(5) to a retractor unit(1).

15 Claims, 8 Drawing Sheets

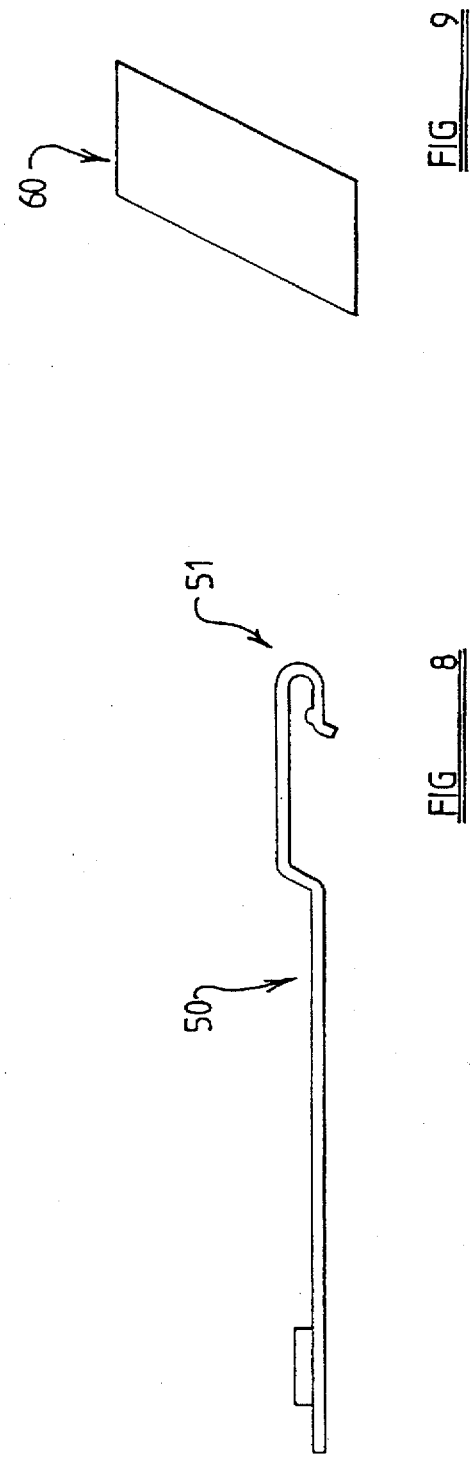
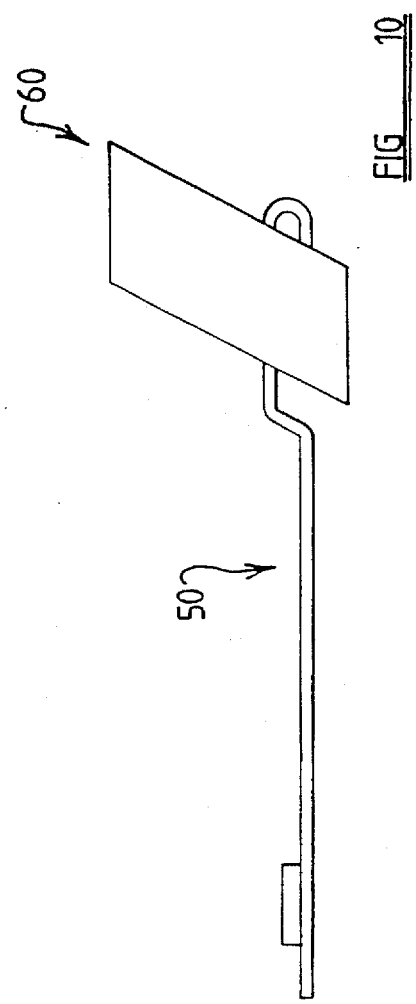

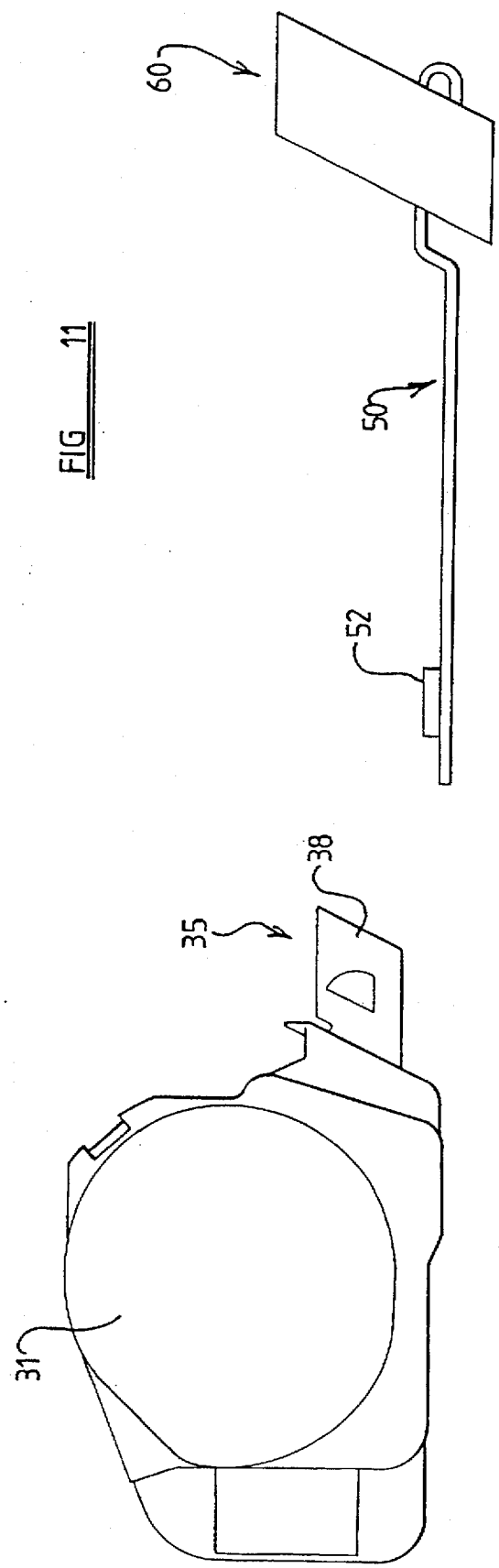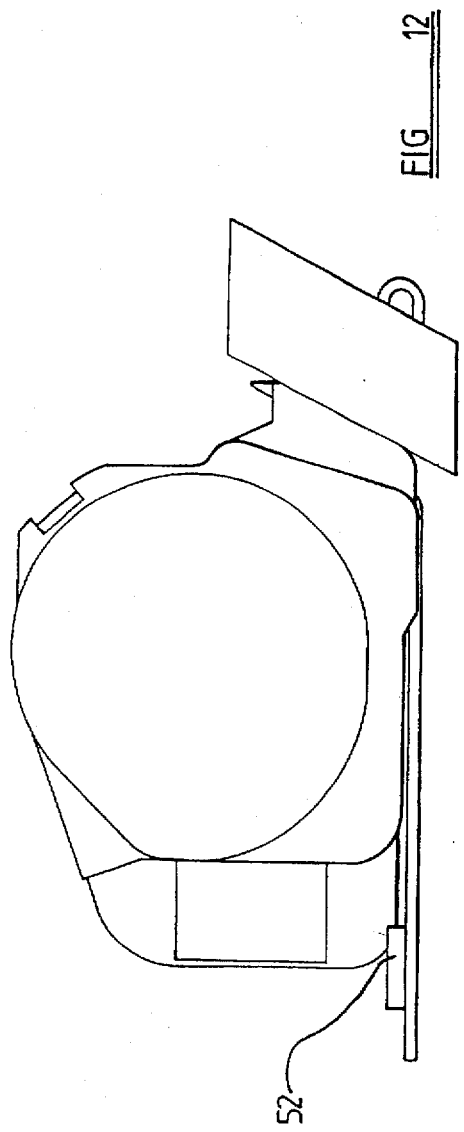

SAFETY-BELT ARRANGEMENT

THE PRESENT INVENTION relates to a safety-belt arrangement and more particularly to a safety-belt arrangement intended for use in a motor vehicle.

BACKGROUND OF THE INVENTION

It has been proposed previously to provide a safety-belt having a retractor reel adapted to retract the safety-belt when it is not in use. It has also been proposed to provide a web-grabber associated with the safety-belt. Such a web-grabber comprises a housing surrounding the safety-belt and incorporating a wedge which can be moved to a position in which the wedge engages and retains the safety-belt. The wedge may be moved to the safety-belt retaining position in the event that an accident should arise, thus helping prevent any of the safety-belt being paid out in an unintentional manner.

In prior-proposed web-grabbers a housing is provided which is in the form of a casting of metal or a moulding of plastic. The casting or moulding defines a passage through which the safety-belt may pass, the passage having a first planar wall against which the safety-belt may run, and a second opposed wall which is inclined in towards the first wall. A wedge element is mounted for axial sliding movement within the housing. One face of the wedge element abuts and may run along the inclined wall as the wedge element moves into the safety-belt retaining position. When in the safety-belt retaining position the wedge element traps the safety belt against the said planar wall.

It is relatively expensive to provide a housing in the form of a casting or a moulding.

The present invention seeks to provide an improved safety-belt arrangement.

SUMMARY OF THE INVENTION

According to this invention there is provided a safety-belt arrangement for use in a motor vehicle comprising a web-grabber, adapted to grab the web of a safety-belt, the web-grabber comprising a housing formed of an extrusion of metal, the extrusion defining a through-passage having substantially parallel opposed side walls, through which the webbing is adapted to pass, the web-grabber further comprising a wedge present within the through-passage movable from a release position to a web-grabbing position, and an additional element having a face adapted to abut one side wall of the passage and another face, inclined thereto, against which the wedge element may slide.

Preferably the extrusion is of aluminium.

Conveniently the extrusion is provided with reinforcing means adapted to reinforce the opposed side walls of the passage.

Advantageously the side wall of the passage abutted by the additional element is of serrated profile, the corresponding face of the additional element having a corresponding serrated profile.

Conveniently the web-grabber is secured to a retractor for the safety-belt.

Advantageously the extrusion is secured the retractor by means of a strap having one end in the form of a hook which engages part of the extrusion, a part which passes through the passage defined through the housing, and a part which is adapted to be secured to an anchoring point. The strap can thus be secured to the anchoring point directly connecting the extrusion to the anchorning point and transferring any load applied to the extrusion directly to the anchoring point. The retractor is mounted on the strap.

In an alternative arrangement a single fastening bolt is used to secure the retractor mechanism to a fixed part of a motor vehicle, and to secure the strap to the retractor mechanism, the strap having one end in the form of a hook which engages part of the extrusion.

Conveniently the retractor mechanism is provided with means which, when actuated, move the wedge to the web-grabbing position in which the wedge engages the webbing of the safety belt.

Advantageously spring means are provided which normally bias the wedge to a non-webbing-grabbing position.

Conveniently the additional element comprises side pieces which extend across the passage, engaging and retaining the strap, and having projections which are secured to the retractor.

In an alternative embodiment the additional element carries lugs having engaging formations therein adapted to engage corresponding formations formed on the retractor. The engaging formations may be sliding snap formations.

The invention also relates to a method of assembling an arrangement in accordance with the invention comprising the steps of securing the extrusion to the strap by inter-engaging the hook at one end of the strap with part of the extrusion, and then engaging the strap with the retractor mechanism.

Preferably, before engaging the strap with the retractor mechanism, the additional element is connected to the retractor, the additional element being located in the extrusion as the strap is engaged with the retractor mechanism.

Preferably, the additional element is connected to the retractor by inter-engaging formations on lugs associated with the additional element with protrusions provided on the retractor.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 8 is a side view of a further component of a seat belt arrangement in accordance with the invention, FIG. 9 is a side view of yet another component of a seat belt arrangement in accordance with the invention, FIG. 10 illustrates the components of FIGS. 8 and 9 when inter-connected, FIG. 11 illustrates the assembled components illustrated in FIG. 7 and the assembled components illustrated in FIG. 10 prior to assembly of those components, FIG. 12 illustrates the components of FIG. 11 when inter-connected.

DETAILED DESCRIPTION OF THE PREFERRED EMBODIMENTS

Figure 1:
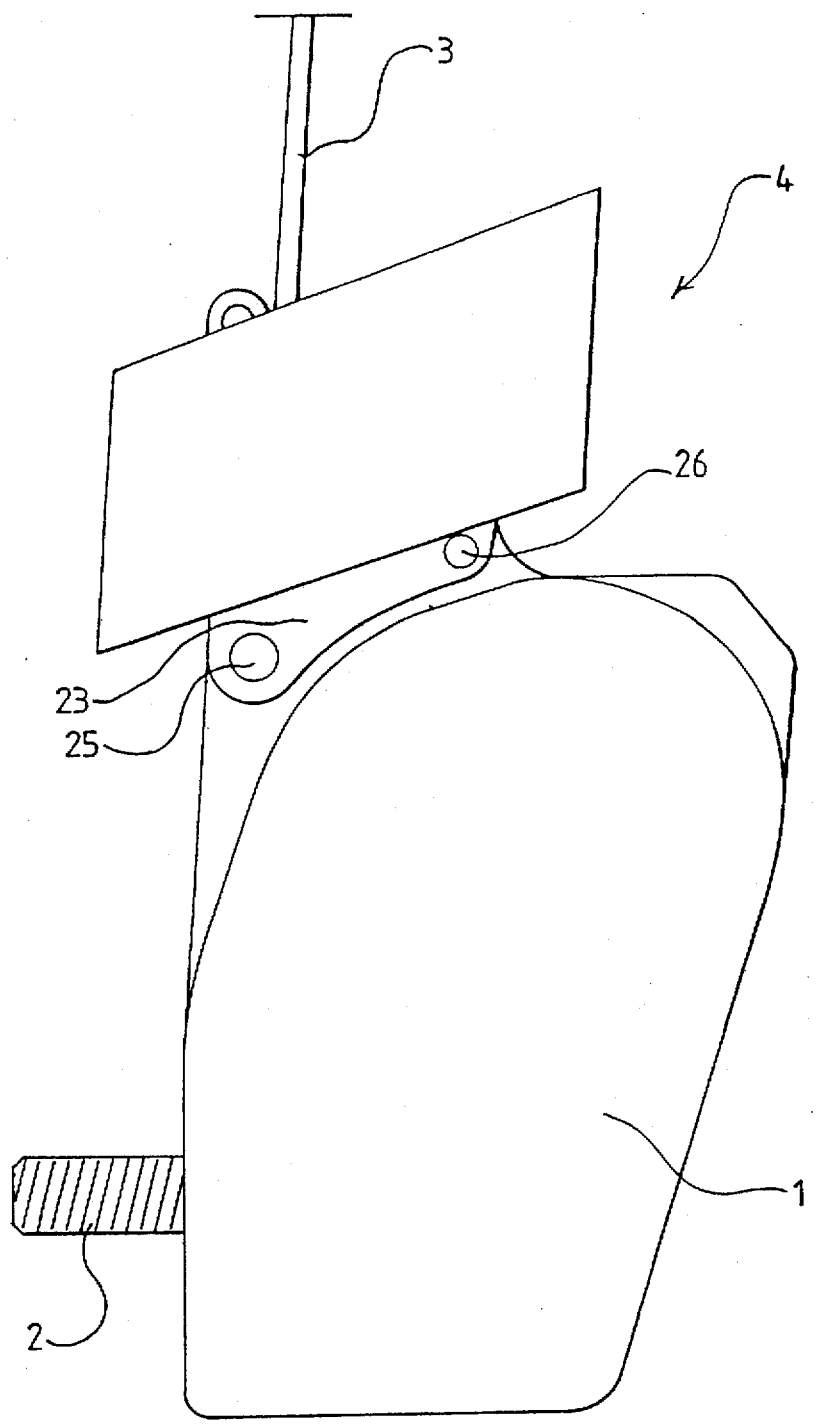
FIG. 1 is a side elevational view of a seat-belt arrangement in accordance with the invention.
Figure 2:
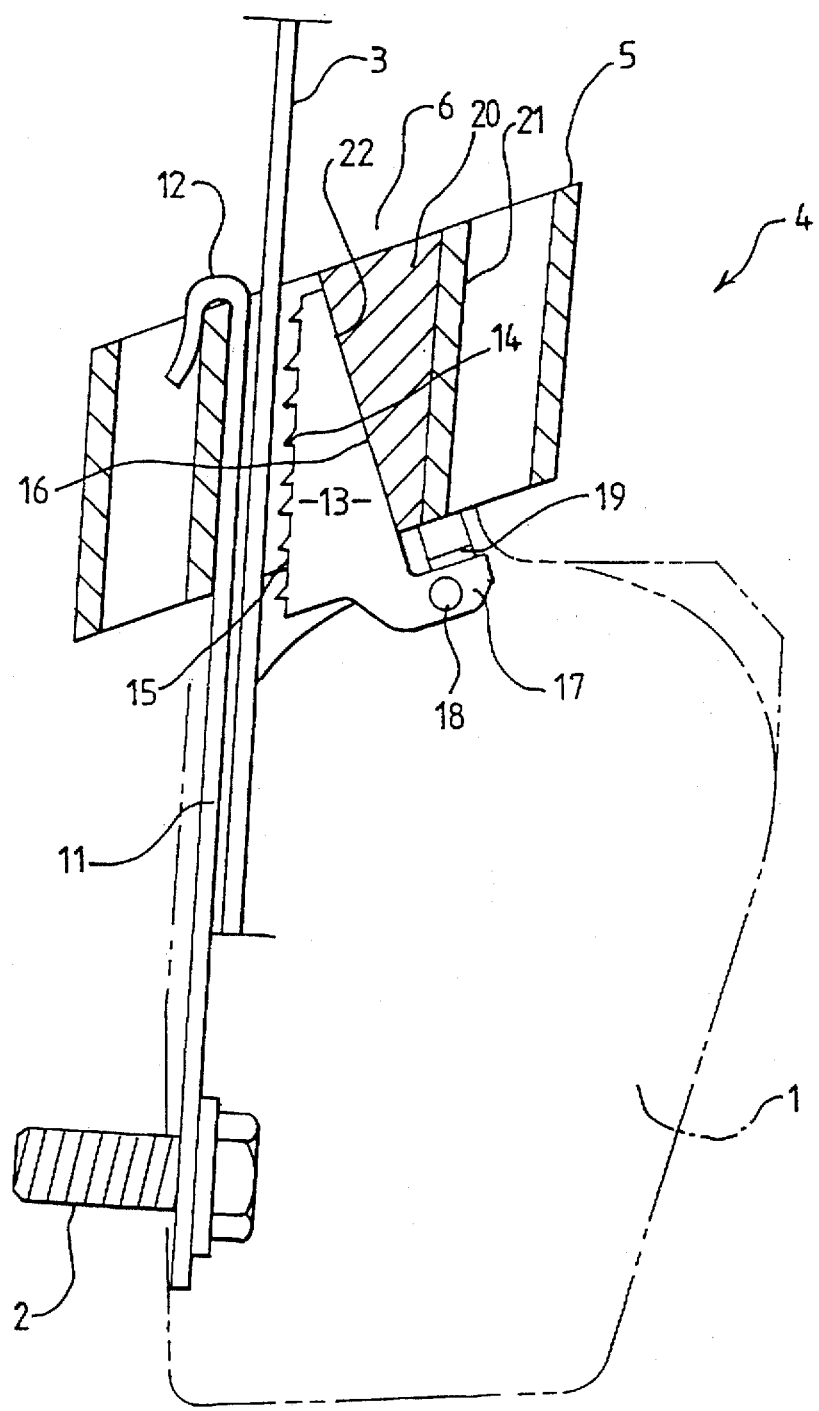
FIG. 2 is a partial sectional view of the embodiment of the FIG. 1 illustrating certain components thereof.
Figure 3:
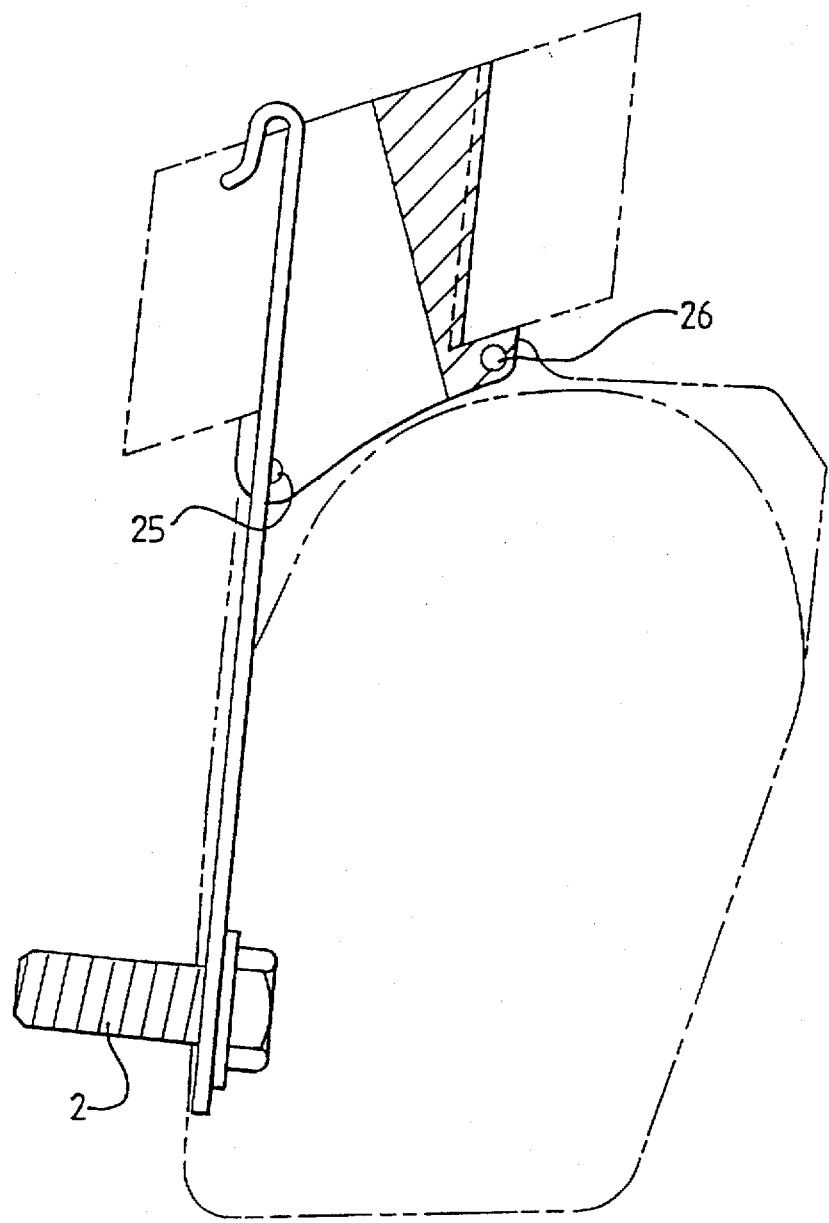
FIG. 3 is a further partial sectional view illustrating further components of the arrangement of FIG. 1.

Referring to FIGS. 1 to 3 of the accompanying drawings a safety-belt arrangement is provided comprising a conventional retractor mechanism 1 which is associated with a bolt 2 which, in use, affixes the retractor 1 to part of the chassis of a motor vehicle. The retractor may be of a conventional design. Associated with the retractor is a safety-belt 3 which is adapted to be wound into the retractor when not in use. The retractor incorporates a mechanism which, should an accident occur, locks a spindle within the retractor to prevent the paying-out of any safety-belt. Such an arrangement is conventional.

Associated with the retractor 1 is a web-grabber 4. As has been mentioned above it has been proposed previously to provide a web-grabber, but the web-grabber of the present invention is of a rather different design to prior-proposed web-grabbers.

The web-grabber 4 comprises a housing 5 formed from a metal extrusion, such as an extrusion of aluminium or the like.

The extrusion defines a central axially extending passage 6 having parallel opposed side walls. As can be seen most clearly from FIG. 4 of the accompanying drawings, one side wall 7 of the passage 6 is substantially planar whereas the opposed side wall 8 is serrated.

The extrusion forming the housing 5 may comprise various reinforcing components 9,10 associated with the side walls.

The housing 5 is held in position relative to the retractor 1 by means of an elongate metal holding element 11 which comprises a metal strap. One end of the elongate holding element 11 has an aperture through which the bolt 2 passes, but fixes the retractor mechanism to the chassis of a motor vehicle. The other end of the elongate metal strap 11 passes through the central passage 6 defined within the extrusion 5, lying adjacent the planar side wall 7, the metal strap 11 terminating with a hook-like formation 12 which engages the extrusion 5 to hold the extrusion in position.

A wedge element 13 is provided which is received within the passage 6. The wedge element has a planar face 14 which lies adjacent one side of the webbing 3 of the safety-belt which passes through the passage 6. The other side of the webbing of the safety-belt runs adjacent the metal strap 11. The planar face 14 is provided with a plurality of teeth 15 adapted to engage the webbing of the safety-belt 3.

The side 16 of the wedge opposed to the planar side 14 is inclined at an angle thereto. The wedge is provided with a protruding lug 17 which is connected by a connector 18 to a mechanism present within the retractor 1 adapted to move the wedge, as will be described hereinafter, to an operative position. A spring element 19 is provided located between the end of the housing 5 and the lug 17 in order to resiliently bias the wedge to a release position as shown in FIG. 2.

Contained within the passage 6 defined within the housing 5 is an additional element 20 which may be made of metal or which may be made of a tough plastics material. The additional element 20 has a serrated face 21 adapted to abut the serrated side wall 8 of the passage 6. The additional element 20 also has an inclined face 22 which abuts and guides the inclined face 16 of the wedge. As can be seen most clearly from FIG. 5 the additional element also has side pieces 23,24 which extend across the passage 6 within the extrusion 5, these side pieces abutting the sides of the metal strap 11 thus retaining the strap 11 firmly in position.

Figure 5:
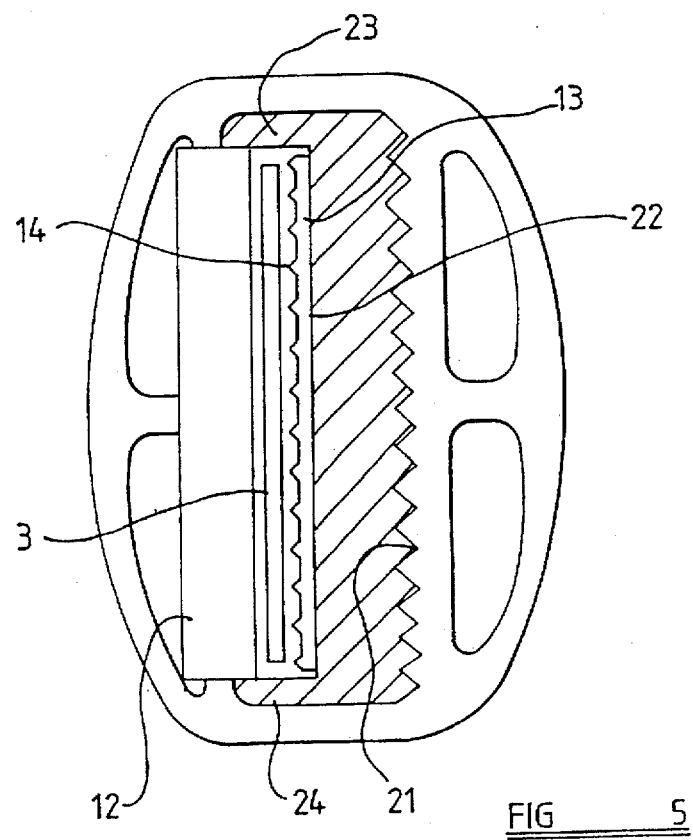
FIG. 5 is an end view of the housing formed from the extrusion of FIG. 4 illustrating, in part, a holding element, an additional element, a wedge and the webbing of a safety-belt.

As can be seen from FIG. 5, the wedge 13 is located adjacent the additional element 20 with the planar face 14 thereof (which carries the teeth 15) separated from the webbing 3 of the safety-belt. Thus, the safety-belt may readily pass through the web-grabber when the components are in the initial position as illustrated. The side pieces 23,24 of the additional element 20 extend (as can be seen in FIG. 1) towards the main body of the retractor 1 and are secured thereto by appropriate fastening means 25,26.

With the arrangement in the condition illustrated, with the edge in the "release" position, the safety-belt may pass freely through the web-grabber. Should an accident arise, a mechanism within the retractor 1 which is responsive to deceleration in excess of a predetermined limit will cause the lug 17 of the wedge 13 to be moved against the spring bias provided by the spring 19, causing the inclined face 16 of the wedge to slide along the inclined face 22 of the additional element 20, bringing the planar face 14 of the wedge, with the teeth 15, into contact with the webbing 3 of the safety-belt. If the safety-belt then tends to be withdrawn from the retractor mechanism, the wedge is brought into a tight clamping condition, with the webbing 3 being clamped tightly between the planar face 14 of the wedge and the strap 11. The web grabber 4 thus prevents any further seat bolt being paid out. Any tension or load applied to the seat belt is transferred to the housing 5, and then, through the strap 11 to the mounting bolt 2. It is envisaged that none of the load applied to the seat belt in an accident will be transferred to the retractor or the retractor housing.

Referring now to FIGS. 6 to 13 of the accompanying drawings, a slightly modified embodiment of the invention is illustrated, showing how the various components are assembled.

A retractor reel 31 is of substantially conventional design and has two spaced apart forwardly protruding lugs, only one of which, 32, is illustrated, located on either side of an open mouth through which a seat belt 33 emerges. The interior face of each lug 32 is provided with various protrusions 34. The retractor reel housing may be made of plastic material, since the retractor is not involved in the transfer of load from the seat belt to the structure or chassis of the vehicle when an accident arises.

A further component 35, is provided comprising two spaced apart lugs, only one of which, 36, is illustrated, the lug 36 having formed, on its exterior surface, a protruding formation 37. The formations on the lugs provided on the element 35 are adapted to inter-engage with the protrusions 34 provided on the lugs on the retractor mechanism 31.

The further component 35, which may made of plastic, carries two projecting arms 38, carried by the lugs 36, but off-set inwardly relative to the lugs 36. Extending transversely between the arms 38 is an element 39 corresponding to the additional element 20, the element 39 having an inclined face and a planar face provided with a plurality of teeth.

Figure 7:
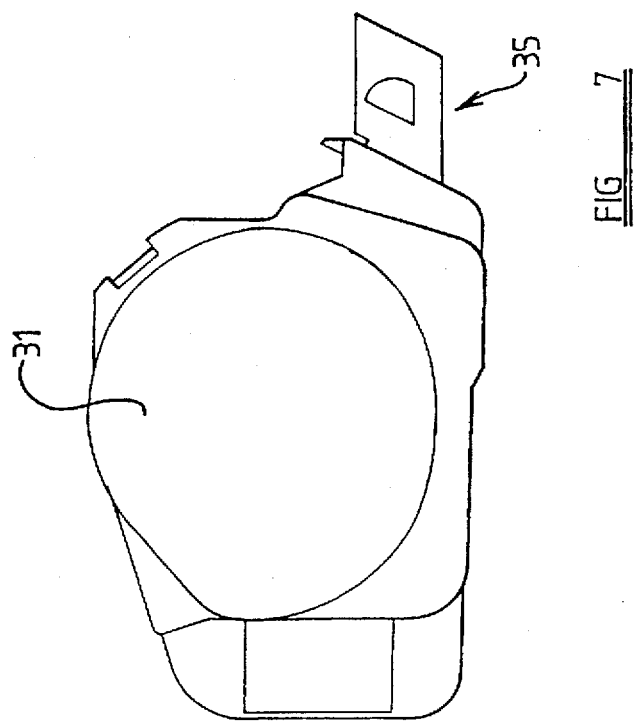
FIG. 7 is a perspective view illustrating the two components of FIG. 6 when inter-connected.
Figure 6:
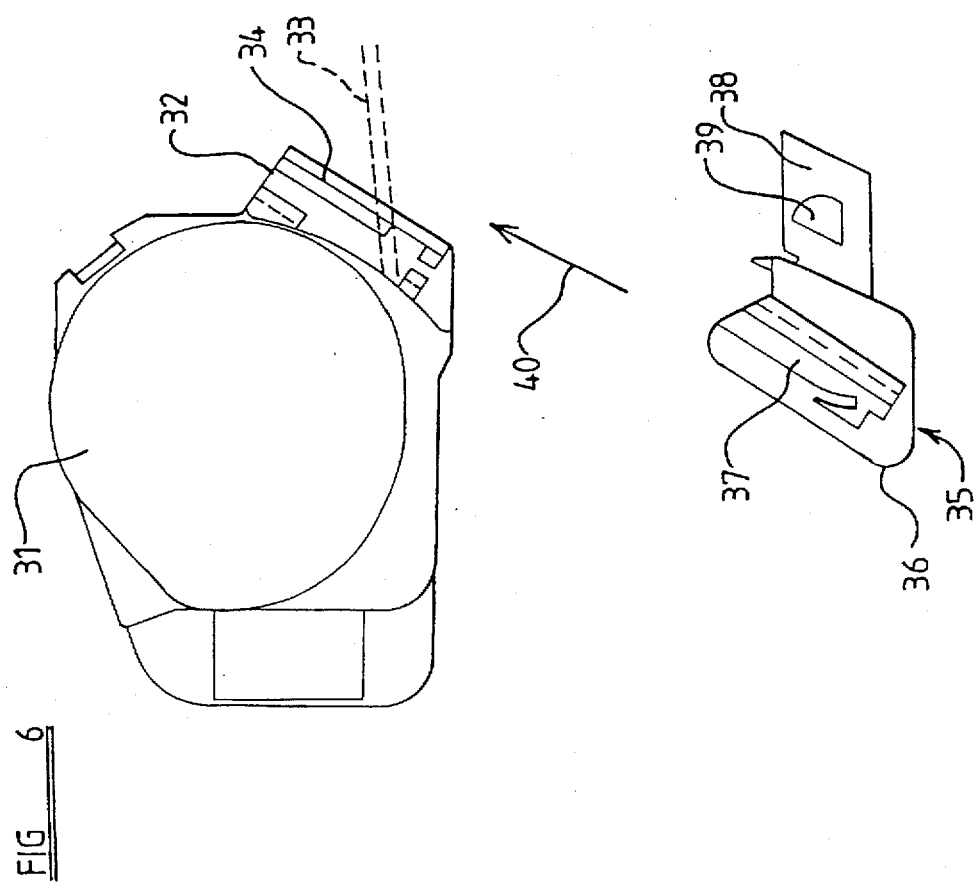
FIG. 6 is a diagrammatic view of two components of a seat belt arrangement in accordance with the invention prior to assembly, with parts thereof cut away.

The further component 35 is mounted on the retractor mechanism 31 by sliding the further component 35 upwardly into engagement with the retractor mechanism 31 as generally indicated by the arrow 40. The protruding formation 37 provided on the element 39 lockingly engage the protrusions 34 provided on the lugs of the retractor mechanism 31. The two components, when inter-connected, have the appearance as shown in FIG. 7.

Referring now to FIG. 8, a metal strap 50 is illustrated having a hook-shaped formation 51 at one end thereof. A reinforced aperture 52 is formed at the other end of the strap to receive a bolt to secure the strap to an anchor point on a vehicle.

Figure 4:
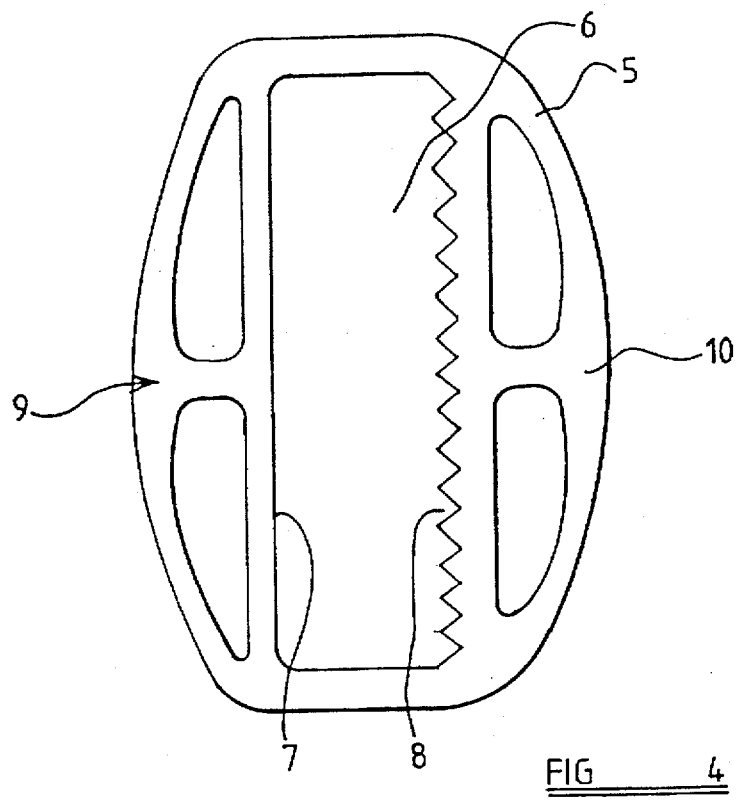
FIG. 4 is a sectional view of an extrusion used to form a housing forming part of the embodiment of FIGS. 1 to 3.

FIG. 9 illustrates a housing 60 which may be substantially identical with the housing 5 illustrated in FIG. 4.

FIG. 10 illustrates the components of FIGS. 8 and 9 when inter-connected. The hook-shaped formation 51 provided at one end of the strap 50 has been inter-engaged with one of the webs forming part of the housing 60.

FIG. 11 illustrates the assemblies of FIGS. 7 and 10 co-aligned for inter-connection. The assembly comprising the strap 50 in the housing 60 is moved toward the left in FIG. 11, with the strap thus being located beneath the main part of the retractor 31. The forwardly extending arms 38 provided on the further component 35 mounted on the retractor 31 pass into the axially extending passage present in the housing 60 corresponding to the passage 6 described with reference to FIG. 4. A wedge element corresponding directly with the wedge element 13 is located in position within the passage as the elements are inter-connected, the wedge element having a protruding lug corresponding to the lug 17 which is connected to a connector, corresponding to the connector 18 and thus to a mechanism present within the retractor 31 adapted to move the wedge element to an operative position. A spring element corresponding to the spring element 19 is also provided.

Figure 13:
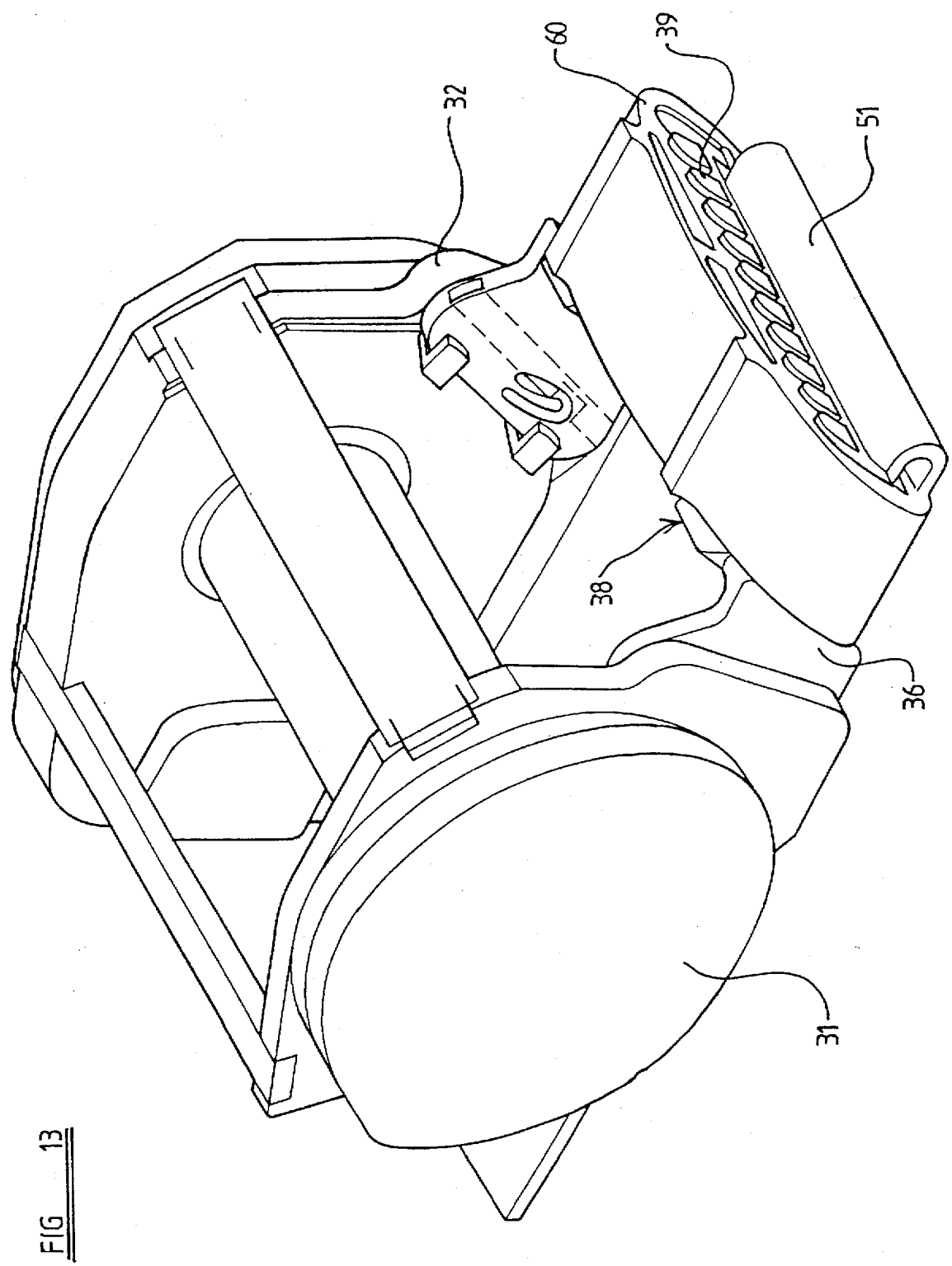
FIG. 13 is a perspective view of a modified form of the seat belt arrangement similar to that illustrated in FIG. 12.

A complete assembly, similar to that illustrated in FIG. 12, is illustrated in perspective in FIG. 13.

It is to be appreciated that the main component of the housing of the web-grabber is an aluminium extrusion which can be fabricated relatively cheaply, but which may easily have the necessary strength. Because the main element is an extrusion, meaning that any through-passage will have substantially parallel opposed walls, the additional element is provided which has one wall adapted to abut one of the said parallel walls and another wall inclined thereto to provide an inclined face along which the wedge may move from the release position to the web-grabbing position.

A preferred embodiment of the invention may be assembled in a relatively straightforward manner. The strap, such as the strap 12 or the strap 50 may very easily be connected to the housing formed of the extrusion of aluminium to form a sub-component. That sub-component may subsequently be connected to the retractor reel and the additional element which, in co-operation with the extruded housing, provides the inclined face along which the wedge may run.

The inter-connection of the additional component which carries the inclined face along which the wedge may run with the rest of the retractor housing can be a relatively simple sliding snap-fit arrangement, as illustrated in the embodiments of FIGS. 6 to 13.

We claim:

1. A safety-belt arrangement in a motor vehicle having a chassis, said safety-belt arrangement comprising a retractor mechanism and a safety-belt having a web and associated with said retractor mechanism, said retractor mechanism being provided with means which fix the retractor mechanism in position on the chassis, and a web-grabber adapted to grab the web of the safety-belt, said web-grabber comprising a housing formed of an extrusion of metal and defining a through-passage having substantially parallel opposed side walls through which said web of the safety-belt passes, said web-grabber further comprising a wedge within the through-passage and being movable from a release position to a web-grabbing position, and an additional element having a face adapted to abut one side wall of the passage and another face, inclined thereto, against which said wedge element may slide, a strap for securing said housing to part of the chassis, said strap having one end which engages part of said housing, an intermediate part which passes through the passage defined through the housing, and a further part secured to the chassis of the motor vehicle.

2. An arrangement according to claim 1, wherein the metal is aluminum.

3. An arrangement according to claim 1, wherein said extrusion is provided with reinforcing means for reinforcing the opposed side walls of the passage.

4. An arrangement according to claim 1, wherein said face of said additional element abuts said one side wall of the passage, said one side wall having a serrated profile and the corresponding face of the additional element having a corresponding serrated profile.

5. An arrangement according to claim 4, wherein said additional element comprises side pieces which extend across the passage, engaging and retaining said strap, and having projections which are secured to said retractor mechanism.

6. An arrangement according to claim 4, wherein said additional element carries lugs which engage formations formed on said retractor.

7. An arrangement according to claim 6, wherein said formations are sliding snap formations.

8. A safety-belt arrangement in a motor vehicle having a chassis, said safety-belt arrangement comprising a retractor mechanism and a safety-belt having a web and being associated with said retractor mechanism, said retractor mechanism being provided with means which fix the retractor mechanism in position on the chassis, and a web-grabber, adapted to grab the web of the safety-belt, said web-grabber comprising a housing defining a through-passage through which said web of said safety-belt passes, said web-grabber further comprising an element movable from a release position to a web-grabbing position, a strap for securing said housing to part of the chassis, one end of said strap engaging part of said housing, an intermediate part which passes through the passage defined through said housing, and a further part secured to the chassis of the motor vehicle.

9. An arrangement according to claim 8, wherein said one end of said strap is in the form of a hook which engages part of said housing.

10. An arrangement according to claim 8, further comprising a single fastening bolt which fixes said retractor mechanism to the chassis, said bolt also engaging said further part of said strap.

11. An arrangement according to claim 1, wherein the retractor mechanism is provided with means which, when actuated, move said wedge to the web-grabbing position in which said wedge engages said web of the safety belt.

12. An arrangement according to claim 1, further comprising spring means normally biasing said wedge to a non-webbing-grabbing position.

13. A method of assembling a safety-belt arrangement in a motor vehicle having a chassis, said safety-belt arrangement comprising a retractor mechanism and a safety-belt having web and associated with said retractor mechanism, said retractor mechanism being provided with means which fix the retractor mechanism in position on the chassis, land a web-grabber adapted to the web of the safety-belt, said web-grabber comprising a housing formed of an extrusion of metal and defining a through-passage having substantially parallel opposed side walls through which said web of the safety-belt passes, said web-grabber further comprising a wedge within the through-passage and being movable from a release position to a web-grabbing position, and an additional element having a face adapted to abut one side wall of the passage and another face, inclined thereto, against which said wedge element may slide, a strap for securing said housing to part of the chassis, said strap having one end which engages part of said housing, an intermediate part which passes through the passage defined through the housing, and a further part secured to the chassis of the motor vehicle, said method comprising the steps of securing the housing to the strap by interengaging a hook at said one end of the strap with part of the housing, and then engaging the strap with the retractor mechanism.

14. A method according to claim 13, wherein, before the step of engaging, the strap with the retractor mechanism, the additional element is connected to the retractor mechanism, the additional element being located in the extrusion as the strap is engaged with the retractor mechanism.

15. A method according to claim 14, wherein the additional element is connected to the retractor by interengaging formations on lugs associated with the additional element with protrusions provided on the retractor mechanism.

* * * * *